C. VAUTIN.
GENERATION OF STEAM FROM THE HEAT CONTAINED IN SLAGS.
APPLICATION FILED OCT. 24, 1914.
1,264,229.
Patented Apr. 30, 1918.
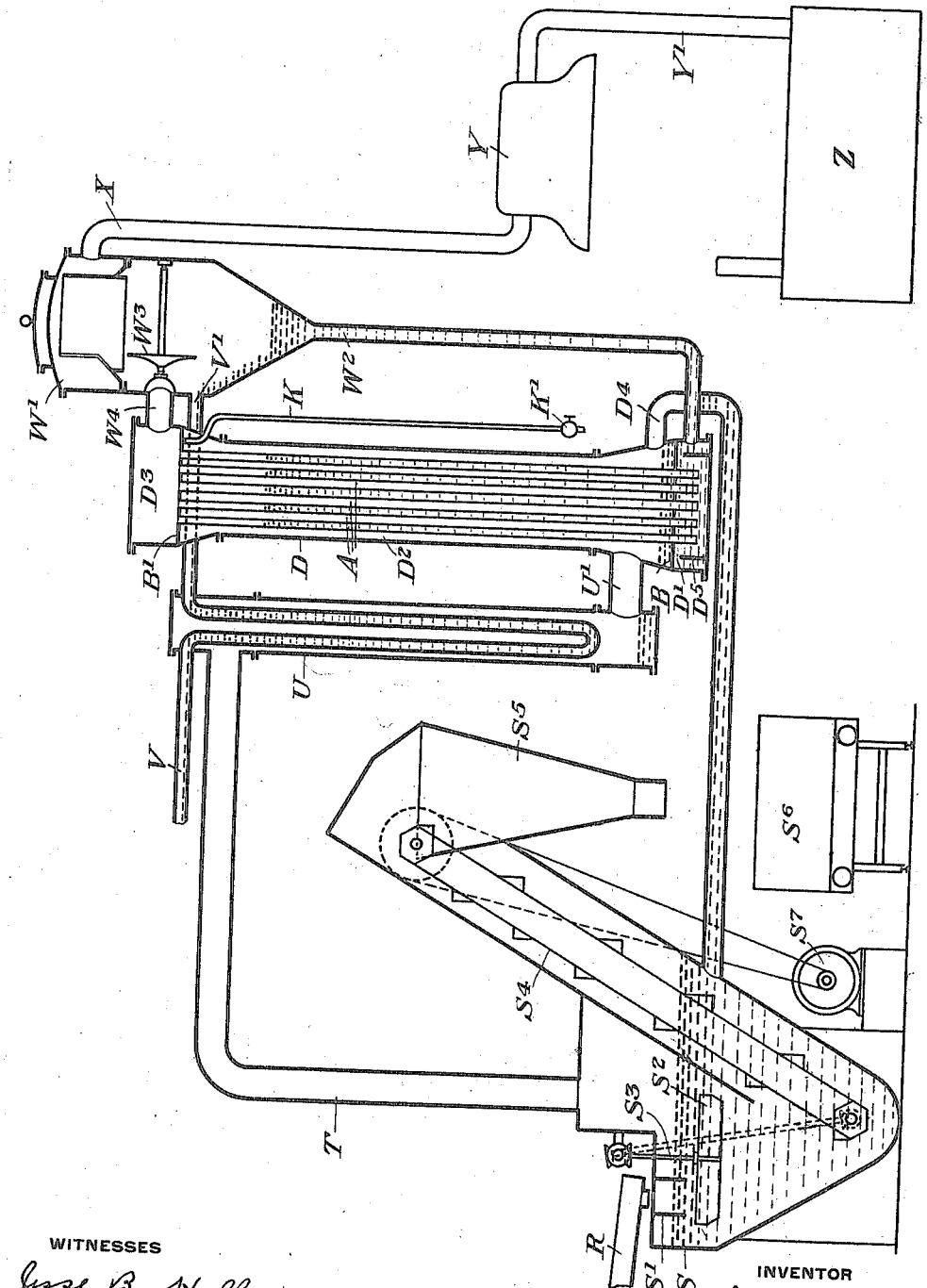

UNITED STATES PATENT OFFICE.

CLAUDE VAUTIN, OF LONDON, ENGLAND.

GENERATION OF STEAM FROM THE HEAT CONTAINED IN SLAGS.

1,264,229.    Specification of Letters Patent.    Patented Apr. 30, 1918.

Application filed October 24, 1914. Serial No. 868,390.

*To all whom it may concern:*

Be it known that I, CLAUDE VAUTIN, a subject of the King of England, residing at London, England, have invented a new and useful Improvement in the Generation of Steam from the Heat Contained in Slags, of which the following is a full, clear, and exact description.

This invention relates to an improvement in method of generating steam from the heat contained in slag, scoria or the like and apparatus therefor, and refers more particularly to the process described in my earlier Patent No. 972,418.

In apparatus and processes for generating steam from hot slag heretofore know to me, the molten slag was brought into contact with the water contained in a closed vessel and the slag thus chilled was removed from the vessel, the low pressure steam produced by the chilling of this slag was fed to a point of use. One of the disadvantages of such a process is that objectional gases were carried off with the steam, which would affect the metal of the turbines or other motors in which the steam was used. There is also danger of finely divided slag being carried over with the steam which has a very destructive effect on the motors.

The object of my invention is to provide a method and apparatus for generating clean steam from hot slag, and which apparatus comprises a closed vessel containing water into which the hot slag is fed, the steam generated thereby being fed to a heat exchanger containing clean water out of contact with the dirty steam which is generated into steam, and delivered to the point of use, the water of condensation from the dirty steam is fed back to the closed vessel in which the slag is cooled.

The precise nature of my invention will be best understood by reference to the accompanying drawing, which will now be described, it being premised, however, that various changes may be made in the details of construction of the apparatus, without departing from the spirit and scope of my invention, as defined in the appended claims.

In the accompanying drawing I have shown in diagram, partially in section and partially in elevation, an apparatus for carrying out my invention. In this drawing, the reference character S designates a generator containing water, and which is closed to the atmosphere. There is an opening through the top of this generator through which the hot slag is fed from a trough R, said opening being sealed by means of a tubular conduit $S'$ which extends below the normal level of the water therein. Rotatably mounted in suitable bearings on the generator is a shaft $S^3$ which extends through the wall thereof, and is provided with blades $S^2$ below the normal water level, and which are arranged to agitate the water as the hot slag passes therethrough. $S^4$ is a slag elevator which is arranged to carry the granulated slag from the bottom of the generator to the top of a chute $S^5$ into which it is delivered and from which it is dropped into trucks or cars $S^6$. One wall of the casing inclosing this elevator extends into the generator below the level of the water to prevent the steam and gases in the top of the generator from escaping through the elevator chute.

Connected to the steam generator S by means of a pipe T, is a heater U, which heater is also connected to a heat exchanger by means of a pipe $U'$. This heat exchanger comprises a shell D which is divided into three compartments $D^1$, $D^2$, and $D^3$ by means of plates B and $B'$. A are water tubes within the heat exchanger which are connected to the plates $B^1$ and B. The lower end of compartment $D^2$ is connected by means of a return pipe $D^4$ with the generator S, to return the water of condensation from the heat exchanger back to the generator. The compartment $D^3$ of the heat exchanger is connected with a separator $W'$ by means of a pipe $W^4$, the lower end of said separator being connected to the compartments D by means of a pipe $W^2$. $D^5$ is an annular baffle in the compartment $D'$ which is arranged to provide means for preventing sediment from entering the tubes A as hereinafter described. Rotatably mounted within the separator $W'$ is a centrifugal separator $W^3$. The upper end of the separator $W'$ is connected by means of a pipe X with one side of a turbine Y, the other side of the turbine Y being connected by means of a pipe $Y'$ with a condenser Z. V is a clean water inlet pipe which extends into the heater U, the water passing through a coil within the heater and thence to the separator $W'$ through the pipe $V'$.

In order to provide means to withdraw uncondensable gases from the system, I provide pipe K which communicates with the upper portion of the chamber D² in the heat exchanger and which pipe is provided with a valve K' which may be opened periodically to withdraw the uncondensable gases.

In the operation of the device hot slag is fed to the generator S, the water therein being agitated by means of the blades S², which is connected by means of suitable gearing with the elevator S⁴ and which is in turn driven by the motors S⁷. The agitator will cause the water to be agitated or circulated with the generator so that fresh water will be continuously moved past the conduit S'. This passing of the hot slag through the water will generate steam in the generator, the steam flowing through the pipe T, heater U, pipe U' into the compartment D² of the heat exchanger, and surrounding the various tubes A extending therethrough, thereby heating the water within the tubes. The water of condensation from the compartment D will pass back to the generator through the pipe D⁴. Clean water from which steam is to be generated for use is passed from the pipe V through the coil in the heater U, and then to the bottom of the separator W'. Any steam generated therein will pass directly to the outlet X and the turbine, and the heated water will fall into the bottom of the separator and will pass from there to the compartment D' of the heat exchanger. The water which flows into this compartment will not flow directly to the open ends of the tubes A, but will flow over the top of the baffle D⁵ and from there to the ends of the tubes A. The steam generated in these tubes A will rise to the compartment D³ and pass from there to the separator W' through the connection W⁴.

The advantages of my invention result from the provision of a method and apparatus for generating clean steam from the heat contained in the hot slag, and in which the steam generated from the hot slag is passed through a heat exchanger in which steam is generated from clean water which is passed to the point of use.

What I claim as my invention and desire to secure by Letters Patent is:—

1. Apparatus comprising in combination, a substantially closed steam-generator containing water, a trapped inlet for slag thereto, means for removing the slag continuously from the generator, a heat-exchanger for generating clean steam by the utilization of the hot steam and gases generated by the slag and water, an apparatus in which the clean steam is to be utilized connected with the heat-exchanger, a conduit for returning the condensed slag-steam products to the generator and means to permit the escape of uncondensed products from the slag-steam circuit.

2. Apparatus comprising in combination, a substantially closed steam-generator containing water, a trapped inlet for slag thereto, means for removing the slag continuously from the generator, a heat-exchanger for generating clean steam by the utilization of the hot steam and gases generated by the slag and water, a low pressure turbine connected with the heat-exchanger to receive the clean steam therefrom, a heat-accumulator connected in the steam-circuit, a conduit for returning the condensed slag-steam products to the generator and means to permit the escape of uncondensed products from the slag-steam circuit.

3. Apparatus comprising in combination, a substantially closed generator containing water, an agitator therein, a trapped slag-inlet for the generator, means for removing the slag continuously from the generator, a heat-exchanger for generating clean steam by the utilization of the hot steam and gases generated by the slag and water, a low pressure turbine connected with the heat-exchanger to receive the clean steam therefrom, a conduit for returning the condensed slag-steam products to the generator and means to permit the escape of uncondensed products from the slag-steam circuit.

In testimony whereof I have signed my name to this specification in the presence of two subscribing witnesses.

CLAUDE VAUTIN.

Witnesses:
P. B. SMYTH,
H. D. JAMESON.